March 9, 1926 — F. P. CHURCH — 1,576,092

INDUCTION METER

Filed Nov. 9, 1923

Inventor:
Frederick P. Church,
by Alexander S. ____
His Attorney.

Patented Mar. 9, 1926.

1,576,092

UNITED STATES PATENT OFFICE.

FREDERICK P. CHURCH, OF LYNN, MASSACHUSETTS, ASSIGNOR TO GENERAL ELECTRIC COMPANY, A CORPORATION OF NEW YORK.

INDUCTION METER.

Application filed November 9, 1923. Serial No. 673,829.

*To all whom it may concern:*

Be it known that I, FREDERICK P. CHURCH, a citizen of the United States, residing at Lynn, county of Essex, State of Massachusetts, have invented certain new and useful Improvements in Induction Meters, of which the following is a specification.

My invention relates to alternating current watt meters and in particular to such a meter which is correct within the commercial limits of accuracy for measuring power on circuits of varying frequency.

My improved instrument is particularly adapted for measuring the power supplied to an alternating current motor where the speed of the motor is varied by varying the frequency of the source of supply. In such systems, for example electrically propelled ship systems, the frequency often varies anywhere from 25 to 60 cycles and where this is the case, the ordinary induction watt meter is inaccurate. In a variable frequency system the voltage often times varies in proportion to the frequency and my improved instrument is also applicable to such conditions.

In carrying my invention into effect, I provide in addition to the usual torque producing element or elements, a counter-torque producing element which is so proportioned with respect to the torque producing element or elements that the resultant torque is substantially independent of frequency variations and proportional to the power flowing in the circuit to be measured.

The features of my invention which I believe to be novel and patentable will be pointed out in the claims appended hereto. The application of my invention to the measurement of energy in a single phase circuit is diagrammatically illustrated in Fig. 1 of the accompanying drawings, and in Fig. 2 I have represented curves showing how the component torques of my improved meter combine to produce a resultant torque proportional to the true power or energy measured.

Figure 1:
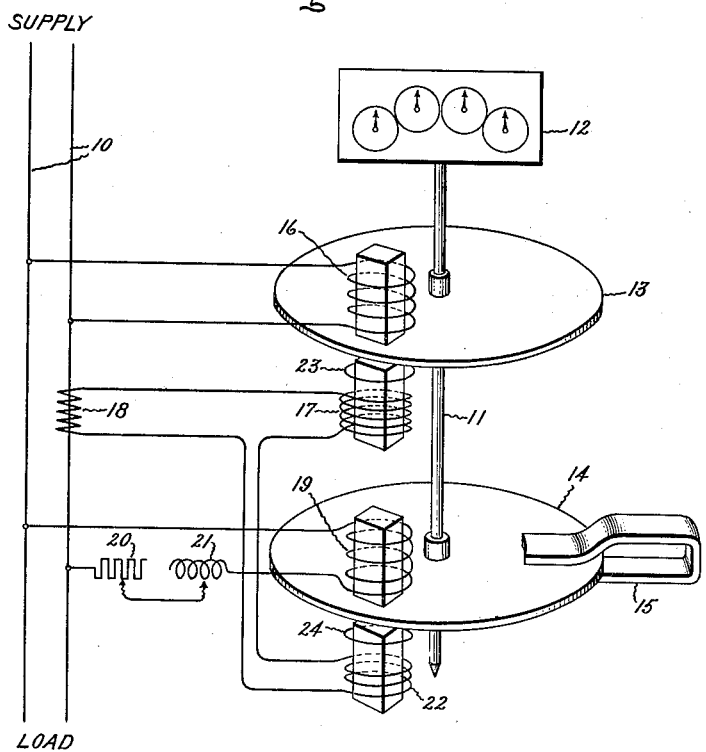

Referring to Fig. 1, 10 indicates in this instance, a single phase supply circuit in which it may be assumed the frequency varies over wide limits accompanied by a corresponding variation in voltage. 11 indicates the shaft of an integrating type watthour meter, the integrating dials being represented at 12. Induction discs 13 and 14 are mounted on shaft 11 and cooperating with one of these discs is the usual drag magnet 15. The upper disc 13 is arranged to be rotated in the usual manner by an induction field member having a potential coil 16 energized from the potential of circuit 10 and a current coil 17 energized in proportion to the current flowing in circuit 10 through a current transformer 18. The lower disc 14 is also provided with an induction field member having a potential coil 19 energized from line 10 through adjustable resistance 20 and adjustable impedance 21 and a current coil 22 connected in series with current coil 17. The upper and lower field members might cooperate with a single disc, if desired, but for the sake of clearness, two discs have been illustrated.

The lower torque producing element is connected to oppose that of the upper element and is made of a fraction of the strength of the upper element, for instance, by a fewer number of turns on the current coil 22, so that the upper element dominates to rotate the shaft 11 whenever power flows in the circuit 10. Lagging means shown as short circuit turns 23 and 24 are preferably provided for both elements. The corrective feature of my improved meter depends upon the fact that while the driving element is subject to frequency errors, the opposing element is subject to frequency errors also, but to a greater degree. By increasing the torque of the driving element above normal and opposing it by the torque of the opposing element and by the usual drag magnet, the effect of which may be assumed to be constant, the meter may be made substantially accurate over wide variations in frequency.

If the voltage of the circuit 10 is substantially constant with wide variations in frequency, the upper element need not be lagged, but the lower element will be underlagged to an amount sufficient to make the meter accurate, for example, at unity and .5 power factor. This underlagging of the lower element increases its losses which means that this element will have a greater error on frequency changes than the top element. Consequently, with a decrease in frequency, the torque of the lower element will decrease faster than the torque of the upper element, but since the torque of the lower element is a fraction only of the total retarding torque, the meter may be speeded up by a proper adjustment of its losses until the error of the top element, for a change in frequency, is just compensated for.

If the voltage decreases with the frequency, which is generally the case, it will be preferable to slightly undercompensate for frequency errors since a decrease in voltage will tend to decrease the torque of the underlagged lower element faster than that of the upper element and if the meter is slightly undercompensated for frequency errors on constant voltage, on circuits where the voltage and frequency vary porportionately, the compensation may be made complete. The best results under these conditions is obtained by lagging the top element so that it is correct at the highest frequency. This necessitates correct lagging of the lower element, but the potential circuit of the lower element may be arranged to have greater losses with a decrease in frequency than that of the top element, for example, by means of the resistance 20, so as to make the compensation substantially correct at all frequencies. I have found that if the torque of the driving element is increased about 30% above normal, and the torque of the opposing element is made about ⅓ that of the driving element, the meter is brought within the commercial limits of accuracy for frequencies varying between 25 and 60 cycles with corresponding variations in voltage and where the power factor is within the limits of .5 and unity.

Figure 2:
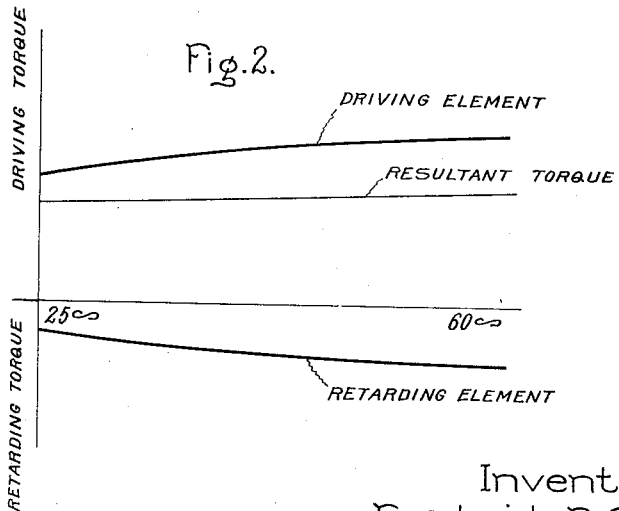

Referring to Fig. 2, the theory of operation of my improved meter may be pictured by plotting the torque of the meter elements against frequency. Thus, let the ordinates above the base line represent driving torque and the ordinates below the base line, the opposing torque, due to the opposing elements. Since the retarding effect of the drag magnet is constant at a given speed, it may be eliminated from the discussion. From Fig. 2 it will be evident that the resultant driving torque is proportional to the difference between the torques of the two opposing elements. While both of the torque producing elements are susceptible to frequency errors, these errors may be easily proportioned by known methods so as to completely or substantially cancel each other in such an arrangement.

From the foregoing discussion, it will be evident that a meter built in accordance with my invention should be designed and adjusted for a definite installation. For example, if such a meter gives accurate results on a system where the voltage varies with the frequency, it will not necessarily give accurate results on a system where the voltage remains constant with a substantial variation in frequency unless proper adjustments of the individual errors are made. This may be accomplished within reasonable limits by the usual adjustment found on standard meters, together with the adjustable reactance and resistance illustrated in Fig. 1. The effect of frequency on meter accuracy is well known and various methods have been proposed of adjusting individual meter elements to make the meter accurate on circuits of varying frequency. However, when the range of frequency over which the variation occurs reaches wide limits, the known methods become increasingly difficult and impracticable. By providing opposing torque elements, the known adjustments may be easily applied to the individual elements to bring the meter within the commercial limits of accuracy for very wide variations in frequency with or without an accompanying variation in voltage, the object being not to eliminate the individual errors in the different elements, but to control them in such a manner that the resultant error is negligible.

It will be evident to those skilled in the art that the invention is applicable to polyphase meters if two or more driving elements and a retarding element responsive to the current and voltage changes in the driving elements are used. Likewise, the invention is applicable to induction wattmeters generally whether of the integrating type or of the indicating type.

In accordance with the provisions of the Patent Statutes, I have described the principle of operation of my invention, together with the apparatus which I now consider to represent the best embodiment thereof but I desire to have it understood that the apparatus shown and described is only illustrative and that the invention may be carried out by other arrangements.

What I claim as new and desire to secure by Letters Patent of the United States, is,—

1. An electric circuit subject to a variable other than its wattage, a wattmeter for metering said circuit having unequal opposing torque producing elements each of which is susceptible in different degrees to an error due to said variable, the individual torques and errors of said elements being so proportioned that the resultant torque is proportional to the true wattage of said circuit within commercial limits of accuracy over the range of said variable.

2. An alternating current wattmeter for circuits of varying frequencies comprising two opposing torque producing elements per phase, said elements being of different strengths and subject to different frequency errors, said parts being so proportioned as to give a resultant torque proportional to the energy of the circuit or phase to be metered thereby over wide variations in frequency.

3. An alternating current induction wattmeter of the integrating type comprising opposing torque elements of materially different strengths, each element being subject to frequency errors, the torques and frequency errors of said parts being proportioned and adjusted to produce a resultant integration proportional to the true energy to be metered thereby over wide variations in frequency.

4. An alternating current circuit the voltage and frequency of which vary proportionally, an alternating current induction wattmeter connected thereto having opposing wattmeter elements of different strengths similarly connected to the circuit, said opposing elements being susceptible to frequency errors in different degrees, the torques and frequency errors of said opposing elements being proportioned so as to produce a resultant measurement proportional to the true wattage of said circuit over wide variations in frequency.

5. An alternating current circuit susceptible to variations in frequency, an integrating type induction wattmeter having a driving wattmeter element and a retarding wattmeter element similarly connected to said circuit, the retarding element being approximately one-third the strength of the driving element, said elements being susceptible to frequency errors of such a character that the frequency error of the driving element is compensated for by the frequency error of the other element whereby the resultant integrations are proportional to the true energy of the circuit or phase metered over the range of frequency variations.

6. An alternating current circuit susceptible to variations in frequency over an appreciable range, a watthour meter having two opposing induction watthour meter elements of different strengths adapted to be similarly connected in said circuit, said elements being accurately compensated for frequency errors near the highest frequency range of the circuit and having frequency errors near the lowest frequency range of the circuit which are substantially inversely proportional to their respective strengths.

In witness whereof, I have hereunto set my hand this second day of November, 1923.

FREDERICK P. CHURCH.